Patented Dec. 22, 1942

2,306,077

UNITED STATES PATENT OFFICE 2,306,077

CHLORINATED ANACARDIC MATERIAL

Emil E. Novotny, Oak Lane, and George Karl Vogelsang, Frankford, Pa., assignors to Durite Plastics, Incorporated, Philadelphia, Pa., a corporation of Pennsylvania No Drawing. Application February 4, 1938, Serial No. 188,796

6 Claims. (Cl. 260—46)

The present invention relates to new chlorinated compositions of matter and to processes for making such compositions.

An important object of the invention is to provide a distinctively new class of chlorinated compositions which are characterized by exceptional properties in the way of chemical reactivity, compatibility and physical properties, which render them eminently suitable for a large number of useful applications in the industries.

Another object of equal importance is to provide a distinctively new class or type of synthetic rubbers, resins and gums, which may be employed in combination with, as well as instead of, both natural and synthetic resins, rubbers and gums.

Another object of importance is to provide a distinctively new class of chlorinated compositions adapted to impart to materials with which they may be incorporated desired rubber-like properties.

Another object is to provide a class of chlorinated compositions which are eminently suitable for the preparation of paints, enamels, varnishes, lacquers, impregnating materials, and molding compositions.

Another object is to provide a class of chlorinated compositions which are particularly suitable for the preparation of frictional elements such as clutch facings, brake linings, etc. as well as abrasive wheels.

Another object of importance is to provide a relatively simple, inexpensive method for preparing the chlorinated compositions of the invention on a large commercial scale.

A further object is to provide a class of anacardic materials that are substantially free of the toxic, dermatitis producing effects that are possessed by the anacardic materials as they are found in nature.

Still another object is to provide a method for producing a substantial reduction in the toxic, dermatitis producing effects characteristic of naturally occurring anacardic materials and certain of their derivatives.

The substances that may be chlorinated in accordance with the teachings of this invention are the shell liquids of certain nuts of the cashew family, e. g. the cashew and marking nuts, as well as anacardic acid, which is the principal ingredient of cashew nut shell liquid, and certain derivatives of cashew nut shell liquid, anacardic acid and marking nut shell liquid. As examples of suitable derivatives of cashew nut shell liquid and anacardic acid may be mentioned the reaction products that result by reacting cashew nut shell liquid or anacardic acid with alcohols (e. g. our Patent No. 2,251,547 issued August 5, 1941), the ultimate products resulting from the interaction of amines with cashew nut shell liquid at elevated temperatures (our Patent No. 2,253,088 issued August 19, 1941), and the products resulting from the reaction of phenols and cashew nut shell liquid.

In the following description and claims, the term "anacardic material," unless otherwise indicated or required by the context, will be used to designate any of the aforementioned derivatives, as well as the anacardic acid and marking and cashew nut shell liquids themselves.

Prior to the present invention, so-called "rubber-like" materials were obtained in various ways, e. g. by treating vegetable oils with sulphur or sulphur chloride, or by polymerizing cashew nut shell liquid by means of strongly acidic materials such as sulphuric acid. The resemblance of these materials to rubber is merely superficial as is evidenced by the fact that their elasticities, elongations and stress-strain curves are wholly unlike those of either natural or synthetic rubbers. In fact, the so-called "rubber like" materials are so inferior to the synthetic rubbers, such as those derived from chloroprene, that they are not generally considered as true synthetic rubbers or even as rubber substitutes. They cannot be substituted for a substantial portion of the rubber in a rubber composition without rendering the product wholly unlike natural rubber. They can, however, be substituted for rubber in many compositions up to about 10% without materially changing the physical properties of the cured product. They apparently have a mild emollient effect on the uncured rubber and for that reason are frequently used as rubber softeners or aids to extrusion.

In marked contrast to the aforementioned products which have but a slight resemblance to rubber, we have discovered that chlorinated anacardic material, particularly when the chlorine content ranges between 12% and 25%, constitutes an intermediate which can be further processed to obtain products which possess the properties of natural and synthetic rubber to such a marked extent that they really can be considered as a class or type of synthetic rubbers or gums. The fact that chlorination of anacardic materials results in the production of synthetic rubbers or gums is very likely due to the presence of two unsaturated linkages in the side chain of the molecule. The anacardic materials also contain phenolic hydroxyl groups which impart to the chlorinated materials the property of being "cured" or "hardened" in a manner which is not possible with either natural rubber or the usual butadiene-derived synthetic rubbers.

Prior to this invention, the following were the only ways in which the "stiffness" of vulcanized rubber could be increased:

1. By the incorporation of reenforcing pigments such as carbon black, zinc oxide and colloidal clay.
2. By changing the type of accelerator.
3. By increasing the amount of sulphur or of accelerator or of both.
4. By incorporating certain organic compounds such as is typified by meta-toluylene diamine.

The chlorinated anacardic material of this invention can be hardened or stiffened by each of the foregoing methods, and in addition can be hardened or stiffened in the same manner as potentially reactive resins, i. e. by the incorporation of hardening agents such as compounds containing reactive methylene groups. As has been indicated, this additional way of increasing the stiffness of the chlorinated anarcardic material is undoubtedly due to the presence in the molecule of phenolic hydroxyl groups. The fact that the materials of the invention can be hardened or stiffened in at least five entirely different ways greatly increases the field of usefulness of synthetic rubbers, for each method of hardening rubbers has its disadvantages as well as advantages, and in the case of the chlorinated anacardic materials it is possible to choose the hardening method best suited for a particular set of conditions. In this connection, it is to be noted that chloroprene rubbers derived from 2-chorobutadiene-1,3 cannot be converted to a stage corresponding to ebonite or hard rubber by chemical means.

We have also discovered that the chlorination of anacardic materials brings about a substantial reduction in the toxic, dermatitis producing effects that are generally possessed by the naturally occurring anacardic materials and certain of their derivatives.

In its very essence, the method of the present invention consists in subjecting the anacardic material to the action of a chlorinating agent such as gaseous or liquid chlorine or to the action of special chlorinating agents such as tertiary butyl hypochlorite. For most practical purposes, the use of gaseous chlorine has been found to be preferable.

The process of the invention may be carried out in many different ways and under widely different reaction conditions and environments to yield products varying considerably in their chemical and physical properties. In each case, however, the product is a chlorinated anacardic material differing fundamentally in both physical and chemical characteristics from the anacardic material originally subjected to the chlorination. In at least this respect, the chlorination products of the invention differ radically from the products obtained by chlorinating such materials as wood pulp and shellac. In the latter case, the chlorination merely serves to bleach whatever coloring matter may be present in the wood pulp or shellac and leaves substantially unaltered the chemical and physical nature of the wood pulp or shellac itself, while the chlorination of anacardic material results in such a profound physical and chemical transformation that the product bears as little resemblance to the original material as the Halowaxes (chlorinated naphthalenes) bear to unchlorinated naphthalenes.

The reaction between the anacardic material and chlorine is strongly exothermic and provision should therefore be made to cool the reaction vessel. It is also advisable to provide means for heating the reaction vessel, as the particular conditions under which the process is carried out may render it advisable to keep the degree of heat at a constant high level from start to finish. The temperature of chlorination appears to have several important effects. Generally speaking, the higher the temperature the more rapid the process of chlorination. The temperature appears also to induce a simultaneous condensation-polymerization reaction which raises the viscosity of the reaction mixture, thereby impeding the further progress of the reaction. This can be overcome to some extent at least by keeping the pH slightly on the acid side, or by adding solvents, diluents or modifiers to the anacardic material either before or during the process of chlorination. It is to be noted, however, that the use of solvents, diluents or modifiers places an upper limit on the temperatures that may be employed. The upper limit depends upon such factors as the boiling point of the added substances, the quantity that may be permitted to vaporize and the particular type of reaction equipment, particularly with respect to reflux condensers.

In addition to affecting the rate of chlorination, temperature also appears to exert an appreciable effect upon the manner in which the reaction proceeds and to some extent controls the distribution of chlorine between the nucleus and side chain of the material being chlorinated. All other things being equal, the tendency at relatively low temperatures is toward the formation of "addition" products while at high temperatures, particularly after a relatively large amount of chlorine has been absorbed, ever-increasing quantities of "substitution" products are produced. On the whole, however, it appears that if the final chlorine content is kept below about 15% on the weight of the finished product, there is no great difference in the composition of the product due to relatively small differences in reaction temperature.

Time is also a factor of considerable importance in the chlorination of anacardic material. All other things being equal, the degree of chlorination depends upon the time that the anacardic material is subjected to the action of the chlorinating agent. However, the degree of chlorination does not appear to be directly proportional to the time, due principally to the fact that condensation-polymerization reactions occur. For a given temperature and degree of chlorination, the degree of condensation-polymerization depends to a large extent upon the time of chlorination. It follows, therefore, that the longer the time of chlorination the higher the viscosity of the resulting product Catalysts do not appear to be particularly effective in enabling the chlorination to proceed at a more rapid rate at lower temperatures. They do, however, favor the formation of "substitution" products. They also serve to overcome the retarding effect of inert solvents, diluents and modifiers which may be added to the anacardic material prior to or during chlorination. In the case of certain inert solvents, diluents and modifiers, catalysts appear to be necessary to bring about an appreciable degree of chlorination. As catalysts may be used all those substances that have been found effective in the chlorination of other organic compounds; e. g. iodine, the chlorides of iron, aluminum, vanadium, molybdenum, etc. Light apparently has very little effect on either the speed or the character of the reaction.

The degree of acidity or alkalinity also exerts a marked influence on the chlorinating process. All other things being equal, it is preferable to carry out the process slightly on the acid side of the neutral point. High acidities and high basicities favor the rapid increase of viscosities which, as has been stated, have a decided tendency to slow up the further progress of the chlorination. Furthermore, the presence of alkalies appear to produce undesirable side reactions.

As has been stated, the chlorination may be carried out in the presence of solvents, diluents or modifiers. These materials may be either of an inert or a reactive nature depending upon the desired result. If it is merely desired to keep the viscosity of the product from rising too high during the course of the chlorination, inert materials are preferable. However, it is to be noted, as previously stated, that with certain inert addition materials catalysts may be essential in the carrying out of the reaction; also that many of the normally inert materials frequently exert a marked influence upon the course of the reaction and the specific nature of the chlorination product.

As examples of materials which may be added to the anacardic material either before or during the chlorination may be mentioned alcohols such as methyl, ethyl, amyl, butyl, isopropyl, and benzyl alcohols, as well as glycerine, the glycols and hexalin; aldehydes such as formaldehyde, furfural, paraldehyde, benzaldehyde, aldol, crotonaldehyde and acetaldehyde; amino-compounds and amines such as aniline, toluidines, morpholine, naphthylamines, alkyl anilines, arylalkyl anilines and glycine (amino-acetic acid); carbohydrates such as sugars; chlorinated compounds such as carbon tetrachloride, chloroform, the chlorobenzenes, ethylene dichloride, tetrachlorethylene, tetrachlorethane, trichlorethylene, pentachlorethane, chlorobutadienes, beta-trichlorethane, phthalic chloride and chloracetic acid; hydrocarbons such as benzene, xylene, naphthalene, anthracene and phenanthrene; ketones such as acetone, methyl ethyl ketone, methyl butyl ketone and mesityl oxide; natural resins and gums such as rosin gum, accroides, dragon's blood, copal, manila gum, fossil resins; nitro-compounds such as nitrobenzene, nitronaphthalene and nitrotoluylene; oils such as linseed, cotton seed, rapeseed, soya bean, teaseed, perilla seed, China-wood, palm, sperm, castor and fish oils; organic acids such as acetic, butyric, propionic, succinic and abietic acids as well as the fatty acids derived from oils; organic anhydrides such as acetic, butyric, succinic and phthalic anhydrides; phenols such as carbolic acid, cresols and xylenols; phenol alcohols such as saligenin, anisaldehyde and salicylaldehyde; sugars such as sucrose; synthetic resins such as the phenol-condensation products and the alkyd resins; and terpenic compounds such as turpentine, rosin oil, pine oil and alphaterpineol. As additional examples may be mentioned the alkyl ethers of polyhydric alcohols, turpentine-hydrochloric acid reaction products, various aldehyde amines and compounds of the type of benzolthiazoles as well as the keto-butanol resinous complexes disclosed in our copending application Serial No. 182,010 filed December 27, 1937 (now Patent No. 2,191,802 issued Feb. 27, 1940). The initial condensation product of acetone and formaldehyde prepared with a high ratio of acetone to formaldehyde in the presence of an alkaline catalyst provides a particularly suitable modifying agent for admixture with the anacardic material to be chlorinated. Not only is this modifying material relatively inexpensive, but it is wholly compatible and miscible with the anacardic material. Being possessed of a low viscosity, it serves to increase the amount of chlorine that can normally be taken up by the anacardic material.

As indicated by the foregoing illustrative list, materials of the most diverse nature may be incorporated with the anacardic material before or during chlorination. The material to be added must of course be miscible with the anacardic material. Like carbon tetrachloride it may be inert or unreactive, or like certain of the other substances it may be a material that can readily react with the chlorine under the conditions obtaining in the process. In the latter case, the chlorination results in the production of modified products of more or less distinct nature as compared to chlorinated anacardic material of the same chlorine content but without such modifiers.

It is to be particularly noted that no two modifying materials give exactly the same result and that the choice of modifying agent predetermines to a large extent the final result. The modifying materials may be used singly or in admixture, and may be added in different proportions depending upon the desired result. For most purposes, particularly for tough rubbery products, the quantity of modifying materials should not be much above 10% on the weight of the anacardic material. Satisfactory results may be obtained with as much as 50% of modifying materials.

The manner in which the chlorination process proceeds can be influenced to a great extent by pretreating the anacardic material to remove water and volatile materials. The presence of water causes oxidation and rapid increases in the viscosity of the material being treated, while volatile materials are the cause of excessive foaming. The pretreatment may consist in heating the anacardic material either alone or in admixture with a small amount of aniline or toluidine. The aniline or toluidine may be added in an amount equal to one-half or one per cent on the weight of the anacardic material. It is of particular interest in this connection that the specific manner of pretreatment has a considerable effect on the amount of the chlorine that can be introduced into anacardic material. To illustrate this effect, it may be stated that if the mixture of anacardic material and aniline (1%) is heated to 360° F., about five more per cent of chlorine can readily be introduced than if the same mixture were heated up to 500° F.

By adjusting the various factors previously discussed, we have found it possible to control the reaction so as to obtain products containing desired amounts of chlorine and differing markedly in their specific physical and chemical properties. Products can be made with chlorine contents as high as 70% on the weight of the anacardic material. The higher chlorination products can be made without undue difficulty by exposing thin films of anacardic material to the chlorination agents. Depending upon the chlorine content as well as upon the degree of condensation-polymerization and the specific nature of the modifying material used in the reaction, the products range from more or less viscous liquids and fusible solids to hard, infusible and insoluble solids. It is to be noted that the unique and distinctive properties which characterize chlorinated anacardic material do not manifest themselves until the chlorine content reaches about 5% on the weight of the anacardic starting material. When the chlorine content reaches about 5%, a substantial reduction is produced in the toxic, dermatitis producing effects of these materials. When the chlorine content is increased to between 15% and 25%, the toxic, dermatitis producing effects are substantially eliminated. For the purposes of producing a synthetic rubber or gum, the best results are generally obtained when the chlorine content ranges from 15% to 25%. When the chlorine content exceeds 30%, the products generally lose their fluid and fusible character as well as the capability of being converted to rubbery masses. Nevertheless, the higher chlorination products, as will hereinafter be pointed out, have a sphere of usefulness for which they are eminently suited.

Specific gravity, specific viscosity and solubility are several of the physical properties which depend upon the various factor which have been discussed. The rate at which both the specific gravity and specific viscosity varies with chlorine content will be indicated under one of the illustrative procedures. As far as solubility is concerned, it may be stated that, generally speaking, when no reactive modifying agents have been used in the chlorination and the condensation-polymerization has been kept down, the products in their intermediate stages have about the same solubility in organic solvents as the unchlorinated material. In other words, the interminate products are generally soluble in such solvents as acetone, benzol, xylol, ethylene dichloride, various esters, etc. The further the chlorination or the condensation-polymerization is carried, the less soluble the product becomes until it finally becomes wholly insoluble in the usual solvents.

Chlorinated anacardic material reacts with an infinite number of organic and inorganic compounds including many of those that have already been mentioned. As examples of suitable reactants for chlorinated anacardic material may be mentioned accelerators of the benzolthiazole type such as mercaptobenzothiazole and condensation products of hexamethylenetetramine with benzyl chloride and 2-mercaptobenzothiazole, accelerators of the aldehyde-amine type such as methylenedianilide, formaldehyde paratoluidine, ethylidene aniline, butaldehyde monobutylamine condensation products, aldehydes such as formaldehyde, furfural, paraldehyde, benzaldehyde, acetaldehyde, propionaldehyde, butyraldehyde, crotonaldehyde and aldol; amino compounds and amines such as aniline, toluidines, benzylamine, morpholine, naphthylamines, alkyl anilines, aryl-alkyl anilines, ethylenediamine, triethylenetetramine, and diethylenetetramine; alkalies and bases such as the hydroxides of lithium, sodium, potassium, magnesium, calcium, strontium and barium; acids such as sulphuric, hydrochloric, hydrobromic, phosphoric, acetic, butyric, succinic, phenol sulphonic, phenyl sulphonic and ethyl sulphonic acids; guanidine compounds such as diortho-tolylguanidine, diphenyl guanidine and triphenyl guanidine; hexamethylenetetramine and its derivatives such as hexamethylenetetramine acetaldehyde bisulphite, hexamethylenetetramine nitrate formaldehyde, monohexamethylenetetramine oxalate, hexamethylenetetramine nitro-phenol, tri-hexamethylenetetramine phenol, and hexamethylenetetramine phenol phthaleinate; oxides and hydroxides of the more electropositive metals as exemplified by zinc oxide; oxidizing agents such as ozone, nitric acid, the oxides of nitrogen, the oxyacids of the haloids, the peroxides, persulphates, and chloranil (tetrachloroquinone); reducing agents such as hydrogen under pressure in the presence of catalysts, metals with acids, and sodium almalgam; salts and similar compounds which readily break down to yield strongly acidic bodies such as zinc chloride, aluminum chloride, bismuth chloride, antimony chloride, sodium acid sulphate, diethyl sulphate, succinyl chloride and acetic chloride; sulphur and sulphur containing compounds such as sulphur monochloride and carbon disulphids; thiuram derivatives such as tetra-methylthiuram disulphide and dipentamethylenethiuram tetrasulphide as well as the keto-butanol resinous complexes disclosed in our copending application Serial No. 182,010 filed December 27, 1937 (now Patent No. 2,191,802, isued February 27, 1940) and their chlorination products.

It is to be noted that the foregoing list of reagents includes many of the materials which are suitable for reaction with the unchlorinated materials as well as many materials which are suitable for use as modifiers in the chlorination process. However, it is also to be noted that the chlorination products react quite differently with the foregoing reagents than do the unchlorinated products. In many cases the chlorinated products react with more greater ease and speed; in some cases the speed of reaction being as much as several hundred times greater than that of the unchlorinated material. In the case of many reagents such as sulphur monochloride, the reaction with chlorinated products containing as much as 15% to 30% of chlorine proceeds smoothly and can be readily controlled to produce uniform and homogeneous compounds. With unchlorinated material, the reaction proceeds in a wholly uncontrollable and violent manner, even when large amounts of inert solvents are added.

There are a large number of compounds which, when added to mixtures of chlorinated anacardic materials containing some of the aforementioned reagents, have the effect of modifying the stiffness, strength, elongation and stability of the product. Thus, certain of the materials inhibit flex-cracking and minimize deterioration due to heat or oxidation. As a few examples of these materials may be mentioned hydroxy-substituted alkyl or alkyl-aryl amines and various nitrogen derivatives such as mono, di, and tri-ethanolamine, phenyl ethanolamine, phenyl-alpha or beta-naphthylamine, meta-toluylene amine, diphenyl-para-phenylene diamine, butyraldehyde-aniline condensation products, diorthotolylguanidine salts of dicatechol borate, N-(parahydroxylphenyl) morpholine, aldol-alpha-naphthylamine, symmetrical dibetanaphthol paraphenylenediamine, ketone-amine reaction products, polymerized trimethyldihydroquinoline and iso-propyl-oxydiphenylamine.

As has been stated, chlorinated keto-butanol resinous complexes may be reacted with chlorinated anacardic material. The chlorinated keto-butanol complexes may be made as follows:

A keto-butanol resinous complex prepared in the manner disclosed in our aforementioned application (now Patent No. 2,191,802 issued February 27, 1940) is introduced into a suitably designed chlorinator provided with a stirrer and with facilities for both heating and cooling. Chlorine gas is bubbled through the material while the temperature is kept at about 200° F. The chlorination proceeds more slowly than in the case of anacardic material and the final content of chlorine varies between 5% and 10%, though higher contents (15%) may be obtained. It is to be noted that the keto-butanol complexes which are best suitable for chlorination are those prepared with a high aldehyde to ketone ratio.

The following procedures for chlorinating anacardic material are given by way of illustration:

Example I

Anacardic material, e. g. the shell liquid of either the cashew or marking nut or one of their derivatives, is introduced into a chlorinator which is provided with suitable means for heating, cooling and agitating the contents thereof as well as with a reflux condenser and a vapor pipe. Chlorine is bubbled through the mass, while the temperature is kept at about 100° F. by circulating cold water. The chlorination may be stopped at any desired point or it may be continued until the viscosity of the product becomes so great that this method of chlorination is no longer effective. The high viscosity limits the chlorine content to between 18% and 24%.

The following table shows the changes in specific gravity and viscosity of the anacardic material as the chlorine content rises during the foregoing process:

| Chlorine content | Specific viscosity (Sturmer units) | Specific gravity |
|---|---|---|
| 0 (at the start) | 30.0 | 1.0084 |
| 7.83 | 35.0 | 1.0230 |
| 9.7 | 52.0 | 1.0350 |
| 10.75 | 55.0 | 1.0366 |
| 11.85 | 75.0 | 1.0465 |
| 12.75 | 123.0 | 1.0572 |
| 13.3 | 174.0 | 1.0650 |
| 17.0 | 383.0 | 1.0907 |
| 18.6 | 1265.0 | 1.1045 |

Example II

The process given in Example I is carried out at a higher temperature, e. g. 250° F. It will be found that the chlorine content at the limiting viscosity will be between 15 and 20%, usually about 17%.

Example III

The process is carried under the conditions given under Examples I or II with the exception that a catalyst is added to the anacardic material. Ferric chloride in an amount equal to about one-half to three per cent on the weight of the anacardic material is added before the process is begun.

Example IV

The process of any of the foregoing examples is carried out in the presence of an inert solvent or diluent such as carbon tetrachloride. The solvent acts as an inhibitor of condensation-polymerization and renders it possible to introduce greater amounts of chlorine than would be otherwise possible. If the reflux equipment is such that the solvent vapors are all washed back into the reaction kettle so that the concentration of the solvent remains substantially the same throughout the entire process, products may be obtained having chlorine contents above 30%. To obtain such high chlorine contents with carbon tetrachloride, the solvent should be present to the extent of about 30% on the weight of the anacardic material.

When the chlorination is complete, the surplus solvent can be removed by distillation or evaporation. A preferable procedure in cases where the chlorinated product is to be further reacted is to delay the removal of the solvent until the final reaction, at which time the product can be oven dried or even baked. If it is attempted to remove all the solvent before the final reaction, high temperatures will be necessary which will tend to cause excessive condensation and polymerization.

Example V

The process of the first three examples is modified by the addition of a reactive modifying agent such as linseed oil. Since the anacardic material and the linseed oil both absorb chlorine, greater quantities of chlorine will be absorbed than otherwise before the limiting viscosities are reached.

Example VI

Anacardic material is introduced into a chlorinator, and then two per cent of ferric chloride, two per cent of linseed oil fatty acid, two per cent of cotton seed oil fatty acid and two per cent of palm oil are stirred in. The mixture is heated to a temperature of 250° F. and chlorine is bubbled through the mass until the limiting viscosity is reached. Usually 18 to 25% of chlorine can be introduced without difficulty.

Example VII

Several chlorinators are connected in series so that when chlorine gas is passed into the first one of the series, the unabsorbed chlorine from the first chlorinator will pass on to the second one and so on to the last one. The number of chlorinators is preferably such that substantially all of the chlorine will be absorbed by the time the stream reaches the last one, and the connections are preferably such that the order of the chlorinators may readily be changed so that the first chlorinator may become the last in the series and the one that was previously the second may become the first, etc.

The material to be chlorinated is introduced into all of the chlorinators, and a stream of chlorine is passed into the first of the series. Solvents, diluents, modifiers and catalysts may be added and the temperature and pH may be controlled, if desired. As soon as the chlorine content in the first chlorinator reaches the desired value, the chlorinated material in said chlorinator is replaced with new anacardic material and the connections changed so that the first chlorinator becomes the last of the series and the one that was second becomes the first. The process is continued with the new arrangement of chlorinators until the chlorine content in the chlorinator first in line again reaches the desired value, when the chlorinated material is again replaced with unchlorinated material and the arrangement of chlorinators again changed.

Example VIII

The process may be carried out continuously in a system containing a plurality of chlorinators so arranged and connected that the chlorine passes continuously from one chlorinator to the next and the anacardic material passes continuously in the opposite direction. Fresh anacardic material and chlorine are continuously introduced and the chlorinated material is removed as it reaches the desired chlorine content.

In the installations described in all of the foregoing examples, facilities may be provided to scrub out the unabsorbed chlorine or any objectionable materials such as hydrogen chloride gas. The apparatus and chemicals for this purpose may be of the type customarily used for the purpose.

The chlorination products of the present invention are on account of their chemical reactivity, compatibility and physical characteristics particularly suitable for a large number of industrial applications. As an indication of their wide field of usefulness, it may be stated that they may be employed for many of the purposes for which unchlorinated anacardic materials have either been used or suggested. For example, the products may be used for the manufacture of adhesives, cements, impregnating agents, lutes, lacquers, paints, varnishes, synthetic resins, gums and rubbers, and molding compositions.

One of the most promising applications for the chlorinated products is as an intermediate in the production of a new class or type of synthetic rubbers or gums. Chlorinated products containing 15% to 25% of chlorine polymerize upon being heated to form soft masses having some rubbery attributes. These rubbery masses may be incorporated with both natural and synthetic resins, rubbers and gums in various proportions to serve as softeners and to yield products suitable for various purposes.

To obtain products approaching in chemical and physical characteristics true natural and synthetic rubbers, the intermediate chlorinated products should be further reacted with reagents favoring cross-polymerization and the formation of cross-linkages. Many of the reagents previously listed are particularly suitable for this purpose. As specific examples may be mentioned benzothiazole derivatives and aldehyde amines as well as the keto-butanol resinous complex disclosed in our copending application Serial No. 182,010 filed December 27, 1937 (now Patent No. 2,191,802 issued February 27, 1940) and their chlorination products or mixtures of two or more of said substances. It is to be noted in this connection that the higher the ratio of ketone to aldehyde in the original condensation, the more suitable is the keto-butanol complex for incorporation with chlorinated anacardic material.

The synthetic rubbers and gums produced by further reacting chlorinated anacardic material may be cured, hardened or stiffened in any of the five ways previously mentioned. Of considerable importance is the hardening by means of hardening agents in the manner that synthetic resins are generally cured. Among the many possible hardening agents for this purpose may be mentioned formaldehyde, paraldehyde, hexamethylenetetramine (hexa), various addition products of hexa such as mono-hexa-oxalate, mono-hexa-phthalate and mixtures of two or more of said materials.

The following is a typical example for the preparation of a rubbery product from chlorinated anacardic material and a keto-butanol complex:

Anacardic material, such as the shell liquids of either the cashew or marking nuts, is first heated with about 1% of aniline to about 500° F. The product is then cooled to room temperature, and chlorinated in the presence of a small quantity of a chlorinated solvent such as ethylene dichloride at a temperature of about 250° F. until between 17% and 22% of chlorine has been absorbed. The resultant product is then mixed with from 5% to 15% of the super-reactive type of Afr resin made according to the disclosure of the aforementioned patent. The mixture is then cured in an oven at a temperature of from 250° to 300° F. for a period of from one to three hours.

The end product resembles products derived from natural rubber in extensibility, appearance and feel. Its rubber-like properties may be augmented by mixing about 5% of natural rubber such as latex, and the product may have incorporated therewith, either with or without the rubber, carbon black (2% to 3%) and organic accelerators such as are employed in the rubber trade.

The following is another example of a method for producing a synthetic rubber:

Anacardic material after being pretreated to remove volatile materials is mixed with a modifying agent consisting of one or more of the following substances: perilla oil (2%), palm oil fatty acid (2%) and cotton seed fatty acid (2%), and with a catalyst such as iodine or ferric chloride. The mixture is chlorinated until the chlorine content reaches 17% to 24%. The product is mixed with super-reactive Afr resin made in accordance with our copending application previously identified, an organic compound of the aldehyde-amine type, a benzothiazole derivative, an amine compound such as tri-isopropanolamine, carbon black and rubber latex (5%). After the ingredients are thoroughly incorporated, the mixture is cured in an oven at about 150° to 350° F. (preferably between 250° and 300° F.) for several hours. The resultant product closely resembles rubber in extensibility, snap, strength etc., is substantially insoluble in organic solvents and is unaffected by ordinary acids and bases.

It is to be particularly noted that the synthetic rubbers and gums produced by the foregoing processes are wholly compatible not only with natural rubbers and latices, but also with various types of artificial and synthetic rubbers and gums including "Thiakol," "Neoprene," methyl-rubber, etc.

The chlorination products either in liquid form or dissolved in a suitable solvent may be used to impregnate or coat various materials such as paper, cloth, wood, etc., for various purposes as for the purpose of preserving wood and timber or for producing ornamental coatings.

Bibulous paper sheets may be impregnated with the chlorination products in the manufacture of typewriter stencil sheets. The chief advantage of stencil sheets made with the chlorinated products is that they have great flexibility and ready cutting qualities in a dry state. They retain the cutting qualities for a long time and do not become sticky and tacky due to the formation of degradation products. Hence, the stencil sheets can be kept on hand for long periods of time. Furthermore, various inks can be used in the mimeographing operation without adversely affecting the impregnant or coating.

Sheets of material impregnated with the chlorinated products may be laminated as in the manufacture of materials exemplified by "Micarta." The chlorinated product may also be used to unite various materials together such as wood to paper, cloth, metal, etc. Ornamental surfacing materials such as veneer, etc., may be cemented to articles of various materials such as radio cabinets, furniture, serving trays, etc.

In applying the chlorinated products to any of the foregoing purposes, they may be admixed with various modifying agents, solvents, plasticizing materials, fillers, hardening agents, glues, casein, latex, resins both natural and synthetic, etc. The treated material may, if considered necessary or desirable, be hardened or cured; i. e. converted to a state wherein the chlorinated product is insoluble and infusible. Laminated materials bonded with the chlorinated products may be cured by merely clamping the laminae together and placing the assembly in a heated dry room or oven.

The chlorination products either in liquid or solid form may be incorporated with various materials to impart thereto increased plasticity, toughness, shock resistance as well as increased dielectric strength, frictional qualities and resistance to chemicals. Among the materials with which the chlorinated products may be incorporated may be mentioned the previously enumerated natural or synthetic resins, asphalts, pitches, drying and non-drying oils, rubbers, latices, gums, etc. The chlorinated products may be incorporated in various ways as by being milled in, dissolved in a common solvent or dispersed together in a common medium. Since the chlorinated products may be readily resinified in situ, they end up in the final products as resins which are wholly compatible with the materials with which they have been incorporated.

The resinous materials produced by reacting the chlorinated products with the various resinous and non-resinous reagents previously listed have a wider range of usefulness than many of the synthetic resins previously produced. They are characterized by better flow, plasticity, moldability, flexibility, etc., than those produced from cashew nut shell liquid or anacardic acid and its other derivatives. They are suitable for either hot or cold molding and are particularly well adapted for casting processes and extrusion molding. Various materials such as fillers, plasticizers and other modifying ingredients may be incorporated. As specific examples of suitable materials may be mentioned natural and synthetic resins such as copal, rosin, fossil gum, shellac, kauri, cumaron and phenol-aldehyde resins, waxes, pitches, drying oils such as linseed oil, tung oil, rape seed oil, castor oil, cotton seed oil, and fish oil, and fillers such as ground slate zinc oxide, wood flour, barytes, iron oxide, asbestos and silica.

The chlorination products and their resinous derivatives are particularly well suited for the fabrication of many articles which have previously been made in whole or in part of other materials. Among such articles may be mentioned electric insulation, e. g. electric power cables, printing plates, phonograph records, noiseless gears, flooring material, abrasive wheels, brake linings and clutch facings. They may also be made into quick-setting cements as well as filling media for small transformers.

In the preparation of abrasive or friction articles, the chlorination products either in liquid form or the solid form in a suitable solvent may be employed to coat the grain for the purpose of promoting the adhesion of the pulverized bond thereto. The chlorination products may be used in the form of their resinous derivatives to bond the grain as well as in their final inert granular form to constitute the grain itself.

The following is an illustrative method for preparing a granular inert product having a high coefficient of friction which renders it particularly suitable for the fabrication of brake linings:

Anacardic material is first pretreated by being mixed with about one-half of one per cent of aniline and heated to about 360° F., the temperature being held at this temperature for about ten minutes.

The pretreated anacardic material is chlorinated at a temperature ranging between 175° and 250° F. until the chlorine content reaches a value between 18% and 25%. The resultant product is mixed with 5% of zinc oxide and 5% of furfural. The technical "dry process" type of zinc oxide has been found particularly suitable for admixture with the chlorinated material. After the materials are thoroughly incorporated with one another, the mixture is oven cured. The temperature may advantageously be set between 180° and 220° F. for a period of about one or two hours, and the product may be further cured at a temperature between 280° and 350° F. for an additional two to three hours. The cured material is tough and flexes slightly in a manner similar to stiff leather. It can be readily pulverized in an impact grinder. When incorporated into brake linings, it greatly enhances their braking action and prolongs their normal period of service.

The following is another illustrative procedure for preparing a product suitable for the fabrication of brake linings:

Chlorinated anacardic material made by any of the illustrative procedures and having a chlorine content between 15% and 30% is mixed with sulphur monochloride in suitable proportions. The resultant product is extremely inert and resistant to the effects of chemicals and heat and may readily be granulated.

The foregoing specification and description include the essential and distinctive thought of our invention, but it is to be distinctly understood that the same may be modified in various ways and/or combined with various other details without affecting the peculiar results obtained, and without departing from the spirit of the invention or the scope of the appended claims in which we intend to claim all the patentable novelty inherent in our invention.

We claim:

1. The method of preparing a chlorinated composition, which consists in subjecting anacardic material to the action of a chlorinating agent under suitably controlled reaction conditions until the anacardic material has taken up from 10% to 30% of chlorine.

2. The method of preparing a chlorinated composition, which consists in admixing anacardic material with an inert solvent and then passing chlorine into the mixture under suitably controlled reaction conditions until from 10% to 30% of chlorine has been absorbed.

3. The method of preparing a chlorinated compound, which consists in reacting anacardic material with a chlorinating agent until the product contains at least 10% of chlorine, and has a specific gravity of at least 1.03.

4. The method of preparing a chlorinated compound, which consists in reacting anacardic material with a chlorinating agent until the product contains between 10% and 30% of chlorine, and has a specific gravity of at least 1.03.

5. As a composition of matter, a chlorinated anacardic material having a chlorine content of at least 10% and a specific gravity of at least 1.03.

6. A chlorinated anacardic material having a chlorine content between 10% and 30%.

EMIL E. NOVOTNY.
GEORGE KARL VOGELSANG.